(12) United States Patent
Hoctor et al.

(10) Patent No.: US 6,810,087 B2
(45) Date of Patent: Oct. 26, 2004

(54) ULTRA-WIDEBAND COMMUNICATIONS SYSTEM

(75) Inventors: Ralph Thomas Hoctor, Saratoga Springs, NY (US); Harold Woodruff Tomlinson, Jr., Scotia, NY (US); Kenneth Brakeley Welles, II, Scotia, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 764 days.

(21) Appl. No.: 09/753,443

(22) Filed: Jan. 3, 2001

(65) Prior Publication Data

US 2001/0053175 A1 Dec. 20, 2001

Related U.S. Application Data

(60) Provisional application No. 60/174,373, filed on Jan. 4, 2000.

(51) Int. Cl.$^7$ .............................................. H04L 27/00
(52) U.S. Cl. ........................... 375/259; 380/33; 380/35; 332/185
(58) Field of Search ................................ 375/259, 219, 375/295, 316, 256, 342, 343, 377; 327/1, 18, 28; 332/185

(56) References Cited

U.S. PATENT DOCUMENTS

| | | | |
|---|---|---|---|
| 2,091,271 A | * 8/1937 | Conklin | 455/214 |
| 4,326,292 A | * 4/1982 | Spilker et al. | 380/33 |
| 4,363,130 A | * 12/1982 | Ramsay et al. | 380/35 |
| 4,641,317 A |   2/1987 | Fullerton | |
| 5,142,287 A | * 8/1992 | LaBerge et al. | 342/35 |
| 6,584,164 B1 | * 6/2003 | Tuukkanen | 375/365 |
| 2001/0055320 A1 | * 12/2001 | Pierzga et al. | 370/480 |
| 2002/0114270 A1 | * 8/2002 | Pierzga et al. | 370/208 |

OTHER PUBLICATIONS

"Impulse Radio: How it works," Moe Z. Win, Robert A. Scholtz, IEEE Communication Letters, vol. 2, No. 2, Feb. 1998, pp. 36–38.

* cited by examiner

*Primary Examiner*—Jean B. Corrielus
(74) *Attorney, Agent, or Firm*—Jean K. Testa; Patrick K. Patnode

(57) ABSTRACT

An ultra-wideband (UWB) communications system combines the techniques of a transmitted reference (TR) and a multiple access scheme called delay hopping (DH). Combining these two techniques using UWB signaling results in a penalty in signal-to-noise ratio (SNR) over conventional pulse position modulation (PPM) techniques but avoids the synchronization difficulties associated with conventional approaches. The signaling pulse waveforms are designed to insure that their power spectral densities, after any frequency translation to the center of an operating band, are essentially spectrally disjoint with frequencies that must be protected. This TR technique is combined with the DH multiple access technique to create a UWB communications scheme that has a greater multiple access capacity than does the UWB TR technique by itself.

34 Claims, 16 Drawing Sheets

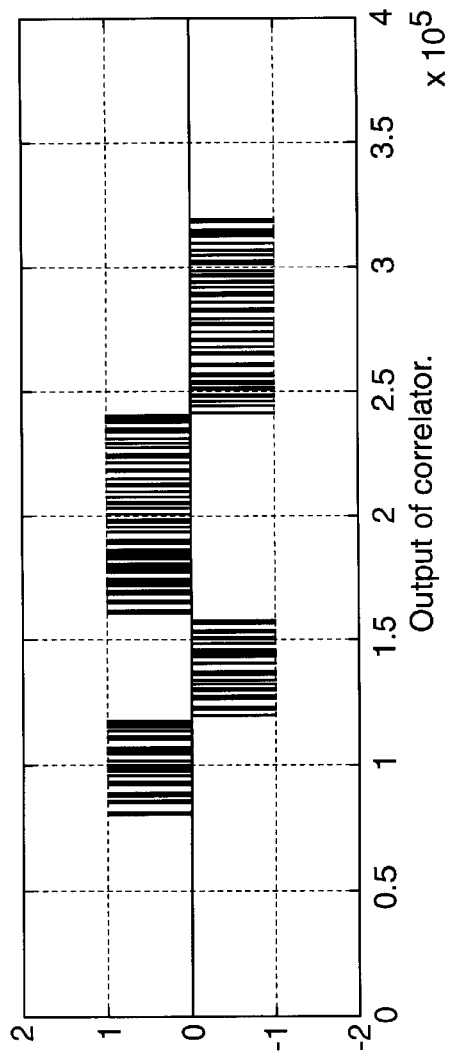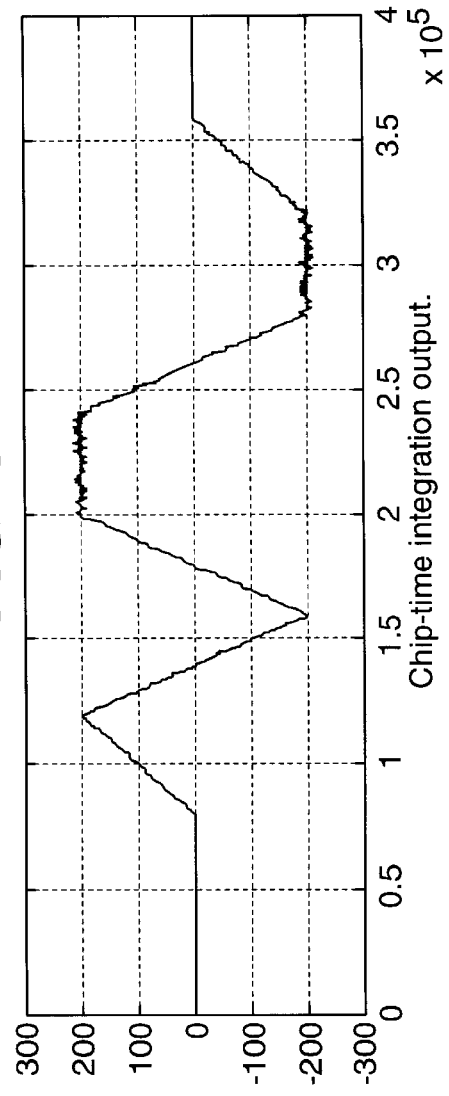

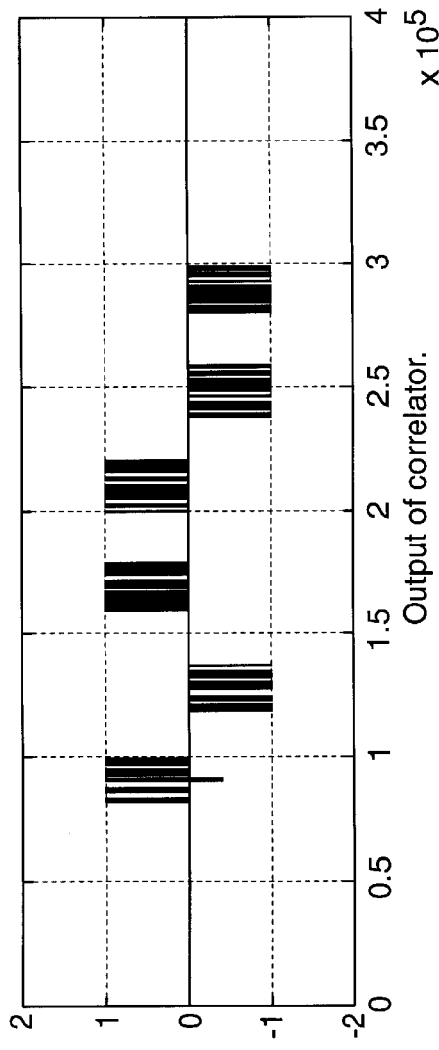
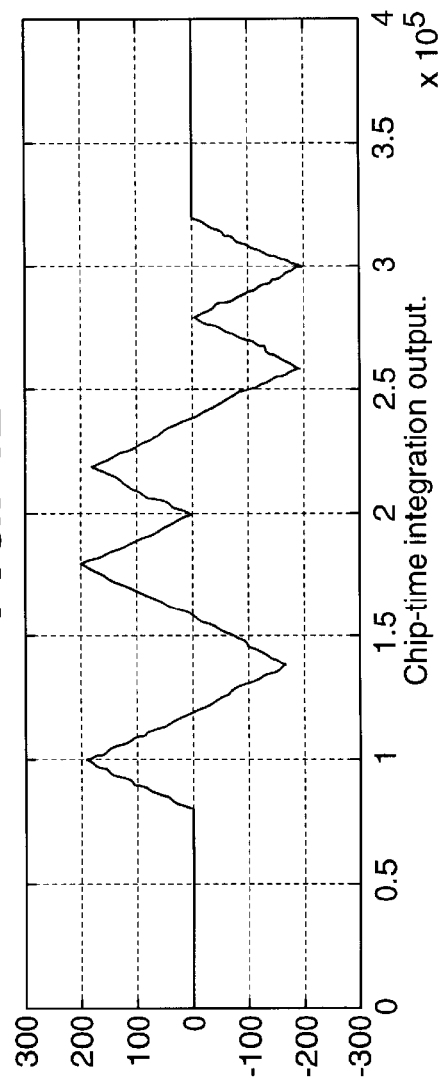

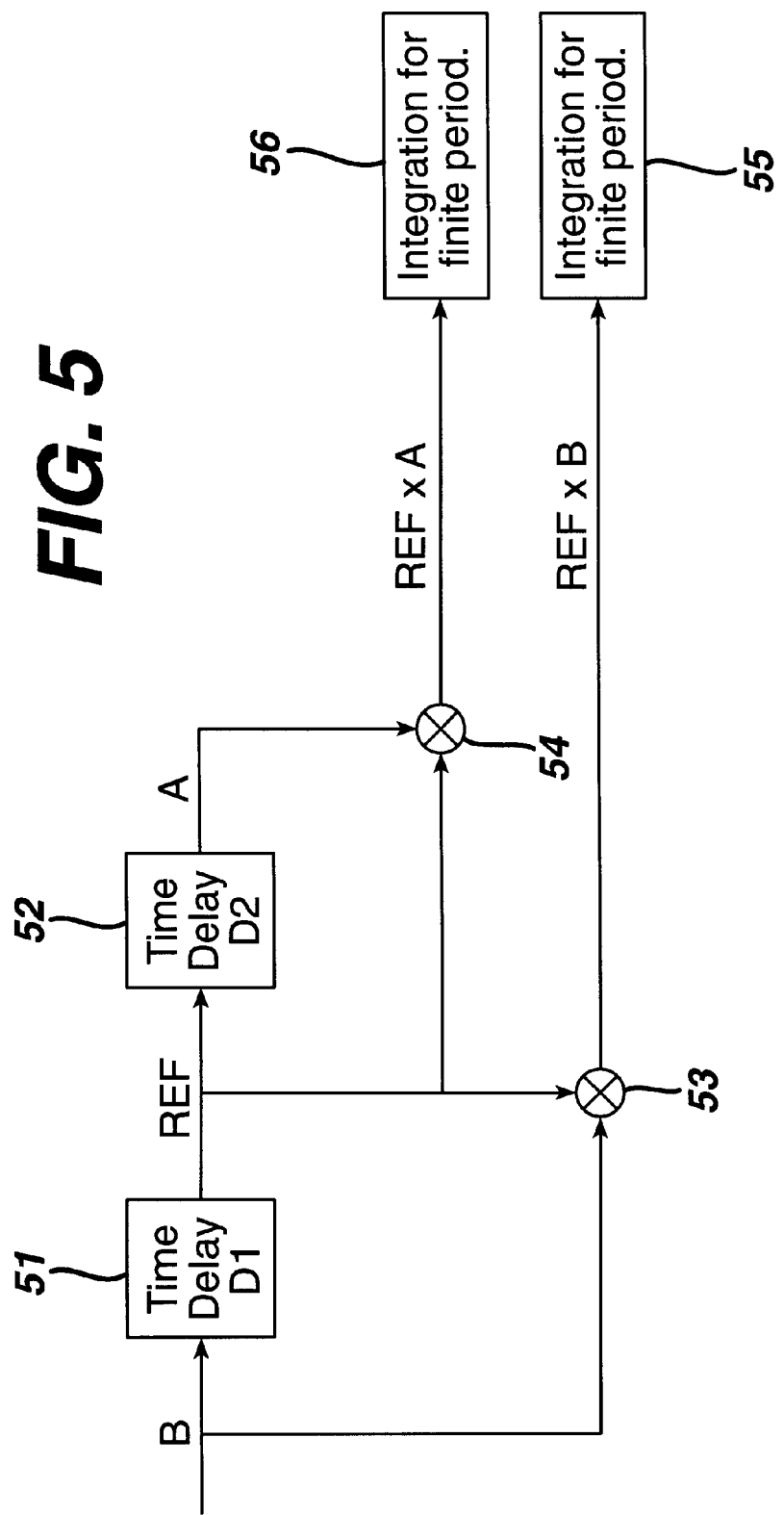

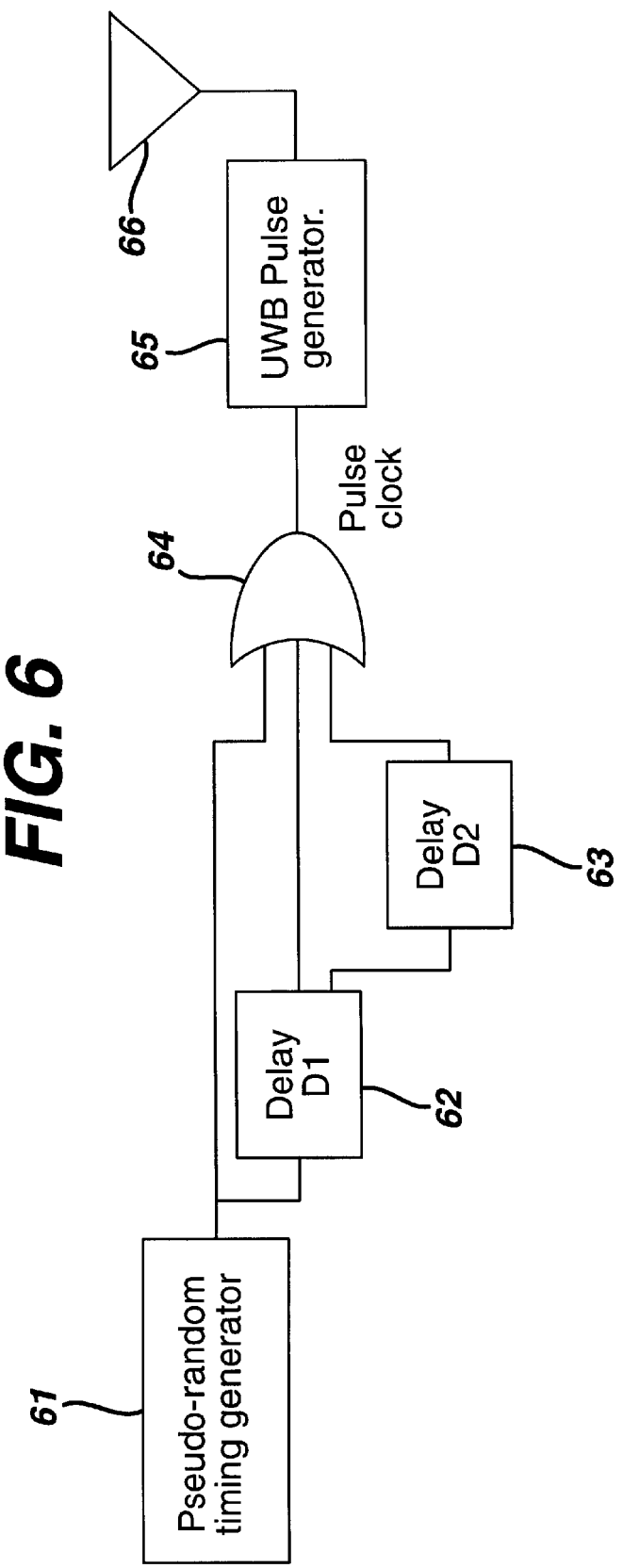

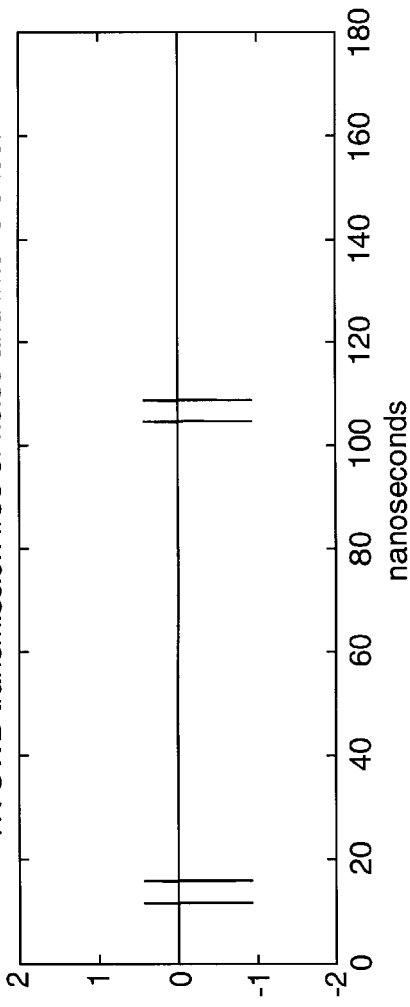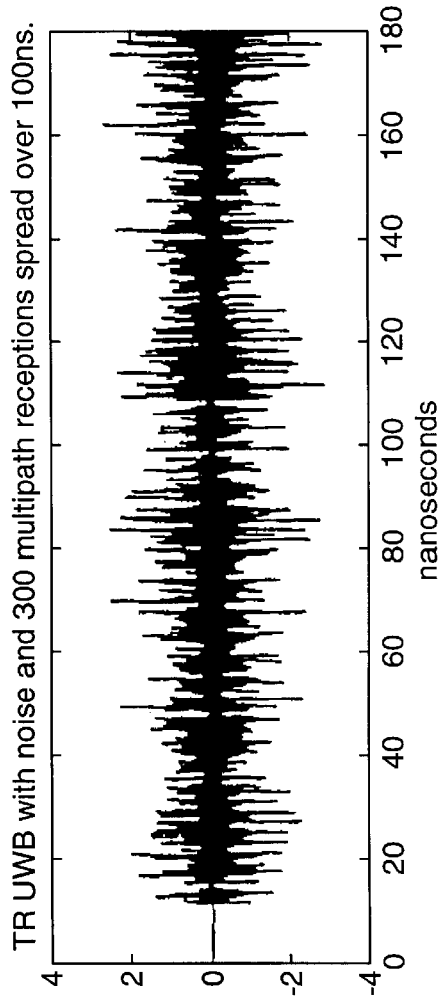

ULTRA-WIDEBAND COMMUNICATIONS SYSTEM

CROSS REFERENCE TO RELATED APPLICATION

This application claims the benefit of U.S. provisional application Ser. No. 60/174,373, filed Jan. 4, 2000.

BACKGROUND OF THE INVENTION

This invention relates to the transmission, reception, detection, synchronization, and use of radio pulse communication systems. In particular, it pertains to a transmitted-reference, delayed hopped (TR/DH) ultra-wideband radio communications system.

Ultra wideband (UWB) radio systems operate by transmitting and receiving a sequence of very short radio frequency (RF) pulses, the duration of which is typically less than a nanosecond. The individual pulses typically have low energy. Consequently, the low duty cycle of the pulsed waveform results in a very low average power. Even with low average power, such pulses can penetrate standard building materials more readily than narrowband transmissions since the spectral content of the signaling pulses is extremely wide and it is likely that part of the occupied spectrum will penetrate. This characteristic of UWB transmissions provides an attractive feature in designing a communications link budget for UWB systems.

One conventional approach to implementing UWB communications systems is to utilize a pulse position modulation (PPM) scheme to impress information onto a UWB carrier. PPM is an orthogonal signaling scheme by which a receiver determines in which one of a number of different time windows a received pulse appears, and this determination conveys a quantum of information, e.g., if there are two possible time windows, determination of one window conveys one bit of information; for three windows, a trit of information is conveyed, for four windows, two bits, and so on.

Successful operation of a PPM system that requires accurate time synchronization be acquired and maintained between transmitter and receiver. For example, for an UWB PPM system, this synchronization must be accurate to within a fraction of the pulse duration. Because the pulse duration is quite small in a UWB system, the synchronization requirements are quite stringent. The time required to establish synchronization for this method can be prohibitive, and acquisition is not always possible in the presence of multiple access interference, which occurs when more than one pair of transmitters and receivers is active at the same time. A long acquisition time is a major risk in the use of conventional PPM UWB communications. Therefore, a need exists for UWB communication systems without the synchronization difficulties associated with conventional approaches.

BRIEF SUMMARY OF THE INVENTION

The present invention consists of the combination of two chief features and innovations surrounding each of them. The first of these is known in the art as transmitted-reference (TR). The TR technique is defined as the transmission of two versions of a wideband carrier, one modulated by data and the other unmodulated. See, for example, M. K. Simon, J. K. Omura, R. A. Sholtz and B. K. Levitt, Spread Spectrum Communications, vol. 1, Computer Science Press, Rockville, Md., 1985. These two signals are recovered by the receiver and are correlated with one another to perform detection of the modulating data. The commonly used wideband carrier is a continuous, wideband pseudo-noise source, and the modulated and unmodulated versions are typically separated from one another in either time or frequency. In the present invention, the carriers used are ultra-wideband pulses. Thus, in the present invention, the term "transmitted-reference" refers to the transmission and reception of multiple pulses in groups whose individual pulses are separated from each other by specific time intervals, known to the receiver. The receiver correlates the received signal with a delayed version of itself over a finite interval to demodulate the signal. In contrast to previous methods, the use of the transmitted-reference technique makes synchronization with the individual pulses unnecessary. On the other hand, it also imposes a signal-to-noise ratio (SNR) penalty when compared with conventional PPM techniques.

When two UWB TR signals are generated with different delays, it is possible, under certain conditions, to receive and demodulate both of them simultaneously, by applying two separate correlators to the same received signal. Thus, the use of different delays, each associated with a separate transmitter, imparts a certain amount of multiple access capacity to an UWB TR communications system. (By "capacity", we mean the supportable number of simultaneous users.)

The second feature of the present invention is a type of multiple access scheme called "delay hopping". The term "delay hopping" refers to a multiple access technique that is related to delay modulation in the same way that "frequency hopping" is related to frequency modulation. The term "delay hopping" is a novel one, and the technique it describes has not, to the best of our knowledge, been suggested before now. In the context of UWB communications, delay-hopping refers to the method of varying the delay used in the TR UWB transmission in a fixed pattern known both to the transmitter and to the receiver. This pattern constitutes a code word, and multiple access capacity is obtained through the code-division multiple access (CDMA) technique.

CDMA is a multiple access method which allows users to access the channel in a random manner. Signal transmissions from different users can completely overlap in both time and frequency in a CDMA system. The demodulation of these signals makes use of the fact that each signal is associated with a code sequence known to the receiver, and this code is usually referred to as a spreading code. Spreading codes of different transmitters should be orthogonal (or nearly so) in the sense that multiple codes can be detected simultaneously with little interference to one another. See Andrew J. Viterbi, *CDMA Principles of Spread Spectrum Communication*, Addison-Wesley Publishing Co. (f1995).

The present invention consists of combining the TR and DH techniques to create a UWB communications scheme that is easy to synchronize and has a usable level of multiple access capacity. In addition, the application of the TR idea to UWB radio is novel, as is the delay hopped CDMA technique.

Refinements to this invention include the use of more than two pulses to form the TR transmission, inducing variation in the pulse repetition time to shape the transmitted spectrum, and transmission of pulses having designed frequency-domain characteristics.

This system has a number of advantages over prior art UWB communication systems:

1. No timing synchronization need be maintained between the reference pulse sequence and the received UWB signal; instead, timing must be acquired at the bit or chip level, with a required accuracy of tenths of a microsecond, rather than 10's of picoseconds. Typically, a UWB receiver generates a local replica of the reference pulse sequence that must be time-aligned with the received pulse sequence before communication can begin. The time required to achieve this synchronization can be long (0.25–2.0 seconds), which presents a large overhead when short messages are to be sent to an unsynchronized receiver. The long synchronization time forces the receiver to use more energy to receive a short burst than it would if it were receiving a transmitted-reference UWB signal. Thus, the use of the TR technique extends the life of a battery-operated receiver for burst-mode communications. The same advantage is true for the transmitter as for the receiver. In fact, the transmitter is more likely powered by batteries than is the receiver in many applications.

2. The receiver will measure the correlation present at its pre-set delay value in all signals that are in the environment. In particular, the multipath reflections of a certain TR transmission will be correlated at the same lag as the direct path. This implies that multipath will add energy constructively in the received signal, rather than destructively. This is true so long as the multipath delay spread is shorter than the integration time of the receiver, which is virtually always the case.

3. Our new system has high immunity to narrowband interference by virtue of both the delay-hopping (DH) feature and the use of more than two pulses in the TR transmission.

BRIEF DESCRIPTION OF THE DRAWINGS

FIGS. 3A and 3B are timing diagrams illustrating, respectively, the output of the correlation and chip-time integration output for continuous, noise-free, pulse-pair transmission at a fixed lag;

FIGS. 4A and 4B are timing diagrams illustrating, respectively, the output of the correlation and chip-time integration for noise-free transmission with gaps;

FIG. 5 is a block diagram of a pulse triplet correlation for delays D1 and D2;

FIG. 6 is a block diagram of a triplet transmitter for delays D1 and D2;

FIGS. 8A and 8B are timing diagrams showing, respectively, TR UWB transmission free of noise and interference and TR UWB with noise and 300 multipath receptions spread over 100 ns;

FIGS. 11A and 1B are timing diagrams showing, respectively, the correlation function modulus and phase angle of complex baseband of interference-free signal.

DETAILED DESCRIPTION OF THE INVENTION

Figure 1:
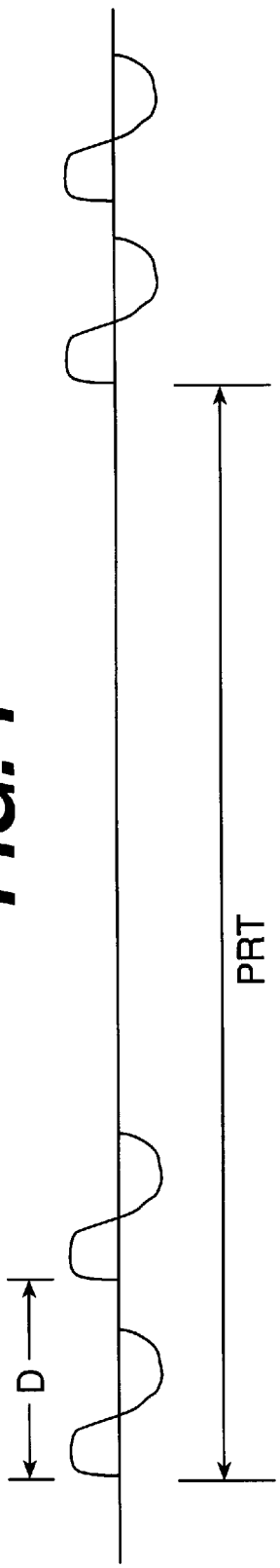
FIG. 1 is a diagram illustrating a transmitted reference pulse pair.

The specific transmitted-reference (TR) method described here requires the transmission of pairs of identical pulses designed as above (called doublets) separated by a time interval, D, known to both the receiver and transmitter. The transmitted data is encoded by the relative amplitude polarity of the two pulses. This signaling scheme is depicted in FIG. 1, with both pulses having the same polarity. More than one doublet can be associated with each information bit, as long as all the associated doublets have the same time interval D between pulses. This would be advantageous if the peak power of the individual pulses is near or below the noise floor; in this case multiple doublets can be integrated to improve the SNR. We refer to the time over which all the transmitted doublets pertain to the same bit as the bit time, or, in the context of the DH scheme, the chip time.

The doublets need not be transmitted at a regular rate. The interval between doublets, called the pulse repetition time (PRT), can be varied in order to shape the spectrum of the transmission. The pulse repetition time (PRT) is depicted in FIG. 1. Because a uniform PRT would result in undesirable line components in the spectrum, the PRT should be (but is in no way restricted to be) randomized. This spectral shaping is in addition to that effected by the pulse design noted above.

Individual pulses in a doublet can be shaped in such a way as to concentrate their energy in certain frequency bands. This method is well known in the field of radar. This method can be used, if required, to accommodate various spectrum restrictions.

Figure 2:
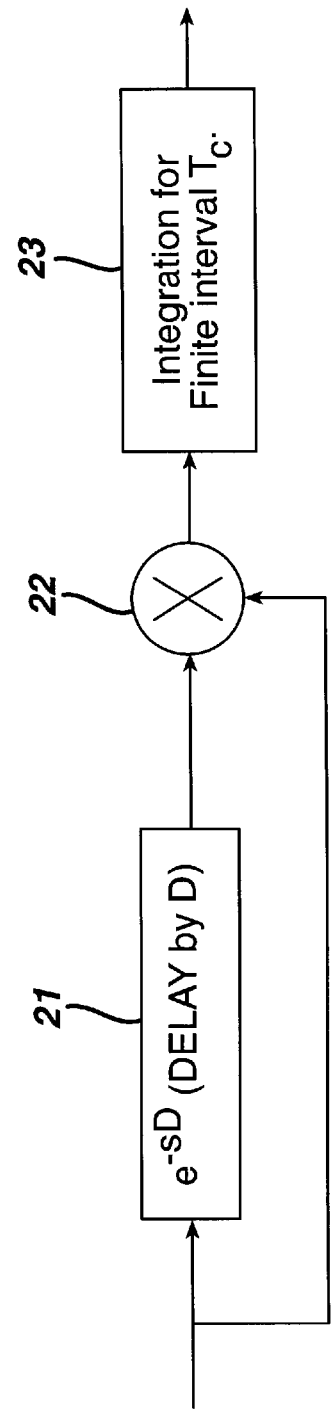
FIG. 2 is a block diagram of the pulse pair correlation for lag D.

We recover the encoded information from a doublet by computing the correlation at a lag given by D. This operation is performed by an electronic circuit called a pulse-pair correlation. A block diagram of the pulse-pair correlation is depicted in FIG. 2. A pulse-pair correlation consists of a delay 21, a signal multiplier 22 and a finite-time integrator 23. The signal is split into two paths, one of which is delayed by delay 21. The two versions of the received signal are multiplied in multiplier 22, and the product is integrated over a specified time, Tc, by integrator 23. The integration time is determined by the number of doublets making up the transmitted bit. The delay is such that the leading pulse of the delayed circuit path is registered in time with the trailing pulse of the undelayed circuit path. This non-zero-mean product is integrated over a symbol interval, Tc, to produce an output signal.

Note that, in practice, the output of the finite-time integrator is only required at some relatively small number of sampling instants. Therefore, the continuously-integrating finite impulse response (FIR) integrator can be replaced by several simple integrate-and-dump circuits, well known in the art, which are sampled in a round-robin fashion by the A/D converter and are dumped by the same clock that triggers the sampling.

A pulse-pair correlation can have more than a single delay, where the multiple delays have nominal values spread around the nominal value of the transmitter's delay. The delay actually used for demodulation is chosen from among the existing delays as that one whose energy output has the highest energy in response to a transmission at the nominal delay. Naturally, this selection can be varied to account for drift in the delay value at the transmitter or receiver caused by temperature, voltage or component aging induced variations. The selection may be different for different transmitters.

FIGS. 3A and 3B depict the noise-free reception of the transmitted bit sequence {1, −1, 1, 1, −1, −1} using the UWB TR scheme described above. FIG. 3A shows the output of the self-multiplier, and FIG. 3B shows the same signal after continuous-output finite-window integration. The time scale gives the sample number in the simulated observation. There are forty doublets per bit in this simulation. Note that with this scheme, not every symbol produces a distinct peak in the correlation output; this will increase the self-noise of the symbol synchronization process. This effect can be mitigated by using a line code that increases the probability of bit polarity transition or by using a scheme such as that depicted in FIGS. 4A and 4B. If the symbols are spaced by twice the symbol duration, the output of the correlation returns to zero between each symbol and the symbols all have the same shape, as shown in FIG. 4A. FIGS. 4A and 4B depict the transmission of the same bit sequence as is simulated in FIGS. 3A and 3B. The transmission of FIGS. 4A and 4B has the same number of doublets per bit as that of FIGS. 3A and 3B, but the average PRT is half that of FIGS. 3A and 3B. Due to the inter-symbol spaces, the long-term average power of the two transmissions is the same. Synchronization to the correlation output of FIG. 4B can be performed with an early/late gate and will not be degraded by a great deal of self-noise.

Note that the examples of FIGS. 3A and 3B and FIGS. 4A and 4B pertain to transmitted-reference systems without delay hopping. These systems use a single, fixed delay on both transmit and receive. In a delay hopped system, consecutive chips are not transmitted at the same delay. Thus, the chip synchronization occurs on waveforms resembling those of FIG. 4B, without the necessity of inserting inter-symbol quiet times between the chips.

A further improvement on the invention is the use of multiple pulses (three or more) separated by a known set of delays, and with controlled polarities. As an example, consider FIG. 5, which depicts a pulse-triplet correlation for triplet correlation. The original signal, denoted as B, is passed through a first delay 51 having a delay time D1 to generate a reference (REF) signal. This signal is passed through a second delay 52 having a delay time D2 to generate a signal denoted as A. Two multipliers 53 and 54 are supplied with the REF signal. The first of these multipliers 53 receives the original signal B, while the second multiplier 54 receives the delayed signal A producing, respectively, signals REF×B and REF×A. These signals are integrated in integrators 55 and 56, respectively.

In order to protect the system from narrow-band interference, the delays, D1 and D2, should be distinct from each other. When larger groups of pulses are transmitted (triplets or quadruplets, for example, rather than doublets), multiple correlations are performed to recover the encoded information. When using N pulses it can be seen that there are (N−1) independent pulse correlations that can be generated at the receiver. For example, in a pulse triplet, this might consist of correlations between pulses 1 and 2 and between pulses 2 and 3. Note that, given these two correlations, the correlation between pulses 1 and 3 is determined. This is advantageous compared to transmission of a doublet, because two correlation values have been conveyed by use of only 150% of the energy required to convey a single correlation using a doublet, since the two message pulses of each triplet share a reference pulse.

Each correlation is equivalent to a single bit of transmitted information. In general, transmission of an N-tuplet conveys (N−1) bits using only (N/2(N−1)) times the energy which would be required to transmit that much information using doublets. This extra information capacity per unit energy can be used either to increase the data rate or to introduce redundancy to help reject interference. If the correlation of spurious signals or electronic noise is shown to be random (which we believe is true), then the noise goes up as the square root of the number of correlations, and the signal-to-noise ratio will therefore increase as the square root of the number of correlations.

The transmitter for the transmitted reference portion of this invention is shown in FIG. 6, for the specific example of a transmitted triplet. The same general scheme can be used to generate any required N-tuplet. Timing pulses generated by the pseudo-random timing generator 61 are delayed first in delay 62 by time D1 and then in delay 63 by time D2. (Note that the timing generator 61 is not required to be pseudo-random but would be in a preferred embodiment of the invention.) The original pulse from the timing generator 61 and each of the delays 62 and 63 are combined by OR gate 64 to generate a pulse clock. When each of the pulses in the pulse clock reaches the UWB pulse generator 65, they initiate an ultra-wideband pulse radio transmission via antenna 66.

The remainder of this discussion focuses on doublets, but the technology is extensible to any number of pulses, as described above.

Figure 7:
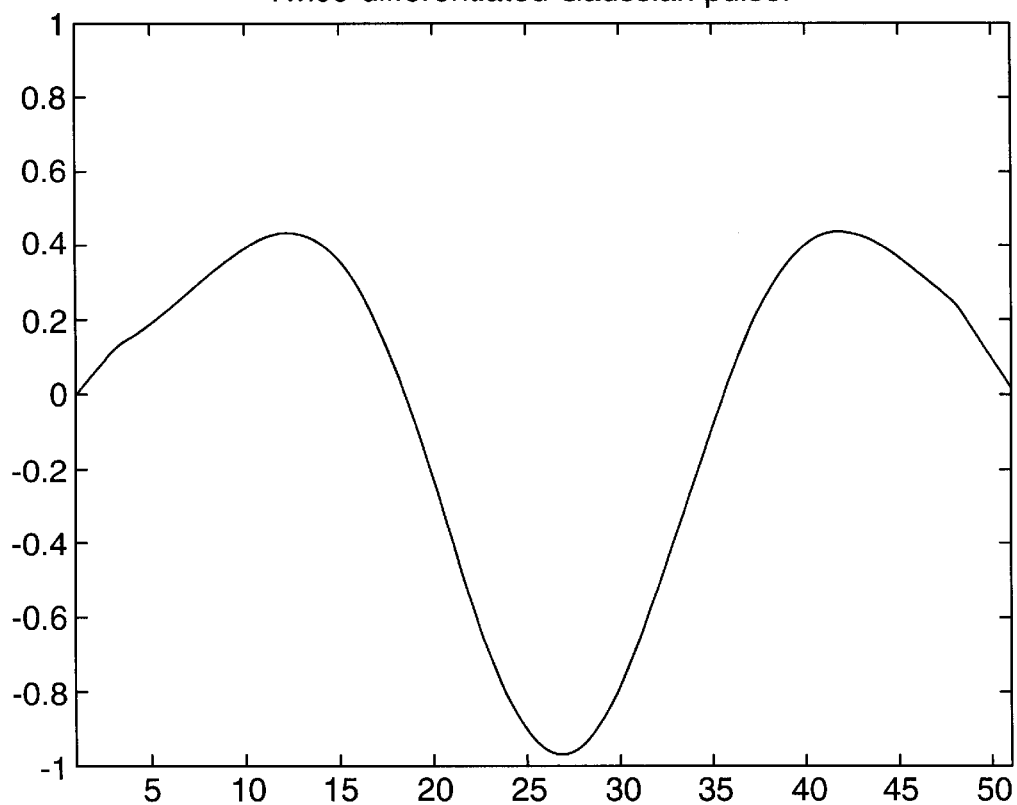
FIG. 7 is a timing diagram of a basic received pulse shape which is approximately the second derivative of a Gaussian pulse.
Figure 9A:
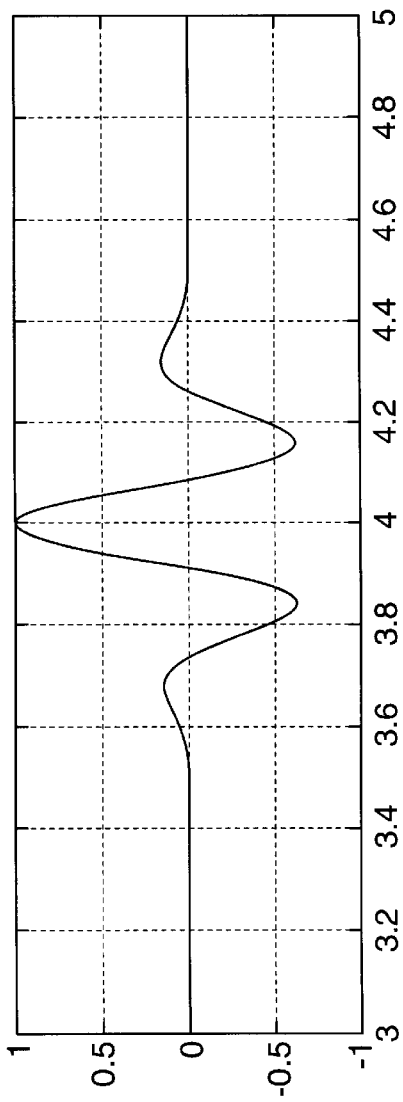
FIGS. 9A and 9B are timing diagrams showing, respectively, the correlation function of the interference-free signal of FIG. 8A and the correlation function of the signal of FIG. 8B.
Figure 9B:
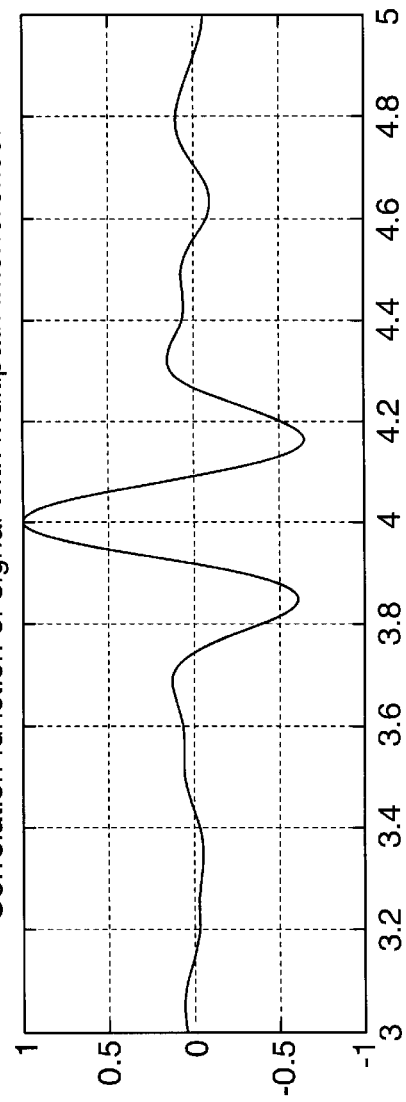

As described above, the receiver of FIG. 2 works by measuring the correlation of the received signal at the lag given by D. This correlation is introduced by the transmitter, which sends pairs of pulses separated by this lag. If the delay used by the transmitter is not the same as that used by the receiver, then a reduction in the measured correlation will result. For example, consider the pulse depicted in FIG. 7. This pulse is (approximately) the second derivative of a Gaussian pulse, which is one plausible model of the received pulse shape. FIGS. 8A and 8B depicts part of a train of pulse pairs composed of such pulses. The pulses in each pair are separated by 4 ns and have the same polarity. FIG. 8A shows the pulse train with no noise and no multipath, and FIG. 8B shows the pulse train with noise and substantial multipath. The multipath was simulated by adding 400 copies of the signal, each delayed by a random interval between 0 and 100 ms. FIGS. 9A and 9B depict the autocorrelation functions of the signals in FIGS. 8A and 8B, plotted against nanoseconds of lag. Examination of FIGS. 8A, 8B and 9A, 9B shows that the autocorrelation function of the received signal has a very narrow peak, and that the autocorrelation function is not strongly distorted by the high degree of multipath present in the signal of FIG. 8B. In both cases, with and without multipath, the correlation falls off to zero about 80 picoseconds away from the nominal value. At lags between 80 ps and 300 ps, the value of the correlation is reversed. If the difference between the transmitter and receiver delays is more than 30 to 40 ps, significant loss of received energy can result, along with possible reversal of the received bit polarities. It would therefore be advantageous to have a receiver structure that has a less critical dependence on the tolerance of the delay factor.

Figure 10A:
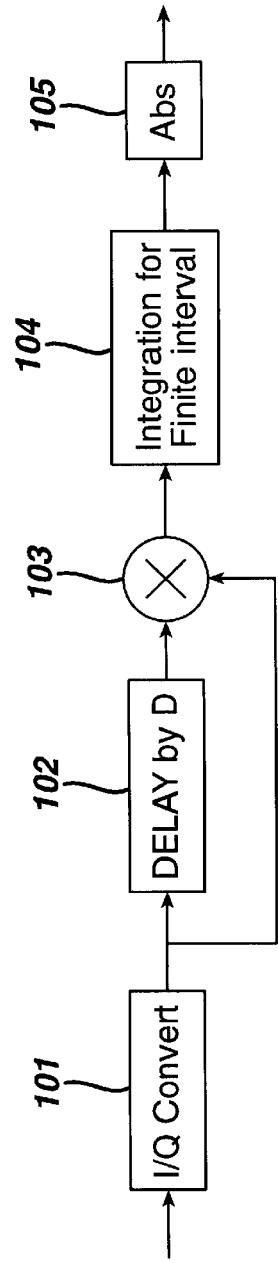
FIGS. 10A, 10B, 10C and 10D are block diagrams showing alternative receivers using the pulse pair correlation of FIG. 2.
Figure 10B:
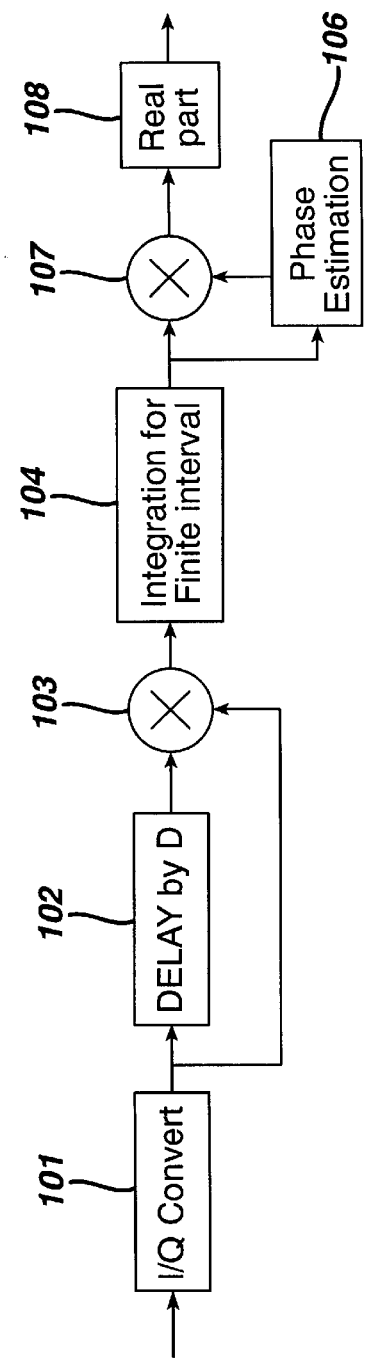

The receivers of FIG. 10A and FIG. 10B use baseband demodulation (I/Q conversion) to modify the shape of the correlation function of the received signal. FIGS. 10A and 10B show two alternative embodiments of the use of this idea. In FIG. 10A, the output of the I/Q converter 101 is split between delay 102 and the signal multiplier 103. The delay 102 delays both the real and imaginary parts of the complex output of the I/Q converter 101, and the signal multiplier 103 performs a complex multiplication of the un-delayed signal path by the complex conjugate of the delayed signal path. The output of the signal multiplier 103 is integrated in finite impulse response integrator 104, which consists of two integrators, one for the real part and another for the imaginary part of the product. The complex-valued output of the integrator 104 is processed in the block 105 labeled "Abs" to obtain the modulus of its complex value. The output of this receiver is always positive, and so its use is restricted to signaling schemes that do not use signal polarity, such as on/off shift keying (OOK).

Figure 10C:
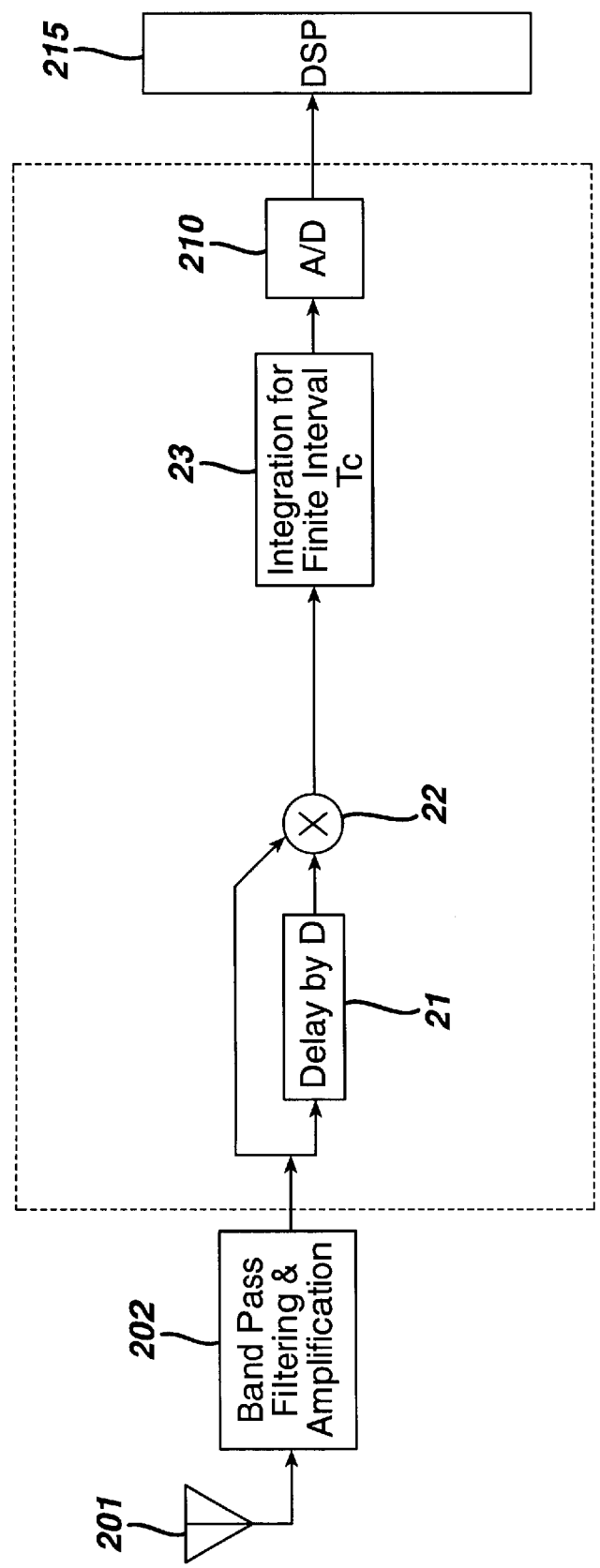

FIG. 10C shows a receiver incorporating the circuitry of FIG. 2. Antenna 201 receives the ultra-wideband signal which is then bandpass filtered and amplified by amplifier 202. The amplified signal is delay correlated by delay 21 and multiplier 22. The correlated signal is integrated by integrator 23, and the integrated signal is digitized by ADC 210. Digitized values are read by digital signal processor (DSP) 215 for decoding. When implementing a receiver with multiple delay channels, then the items inside the dotted line (21, 22, 23, 210) are repeated once for each different delay channel. Each receiver requires only one copy of antenna 201, amplifier 202 and DSP 215. FIG. 10C depends critically on matching transmitter and receiver delays as described above.

Figure 10D:
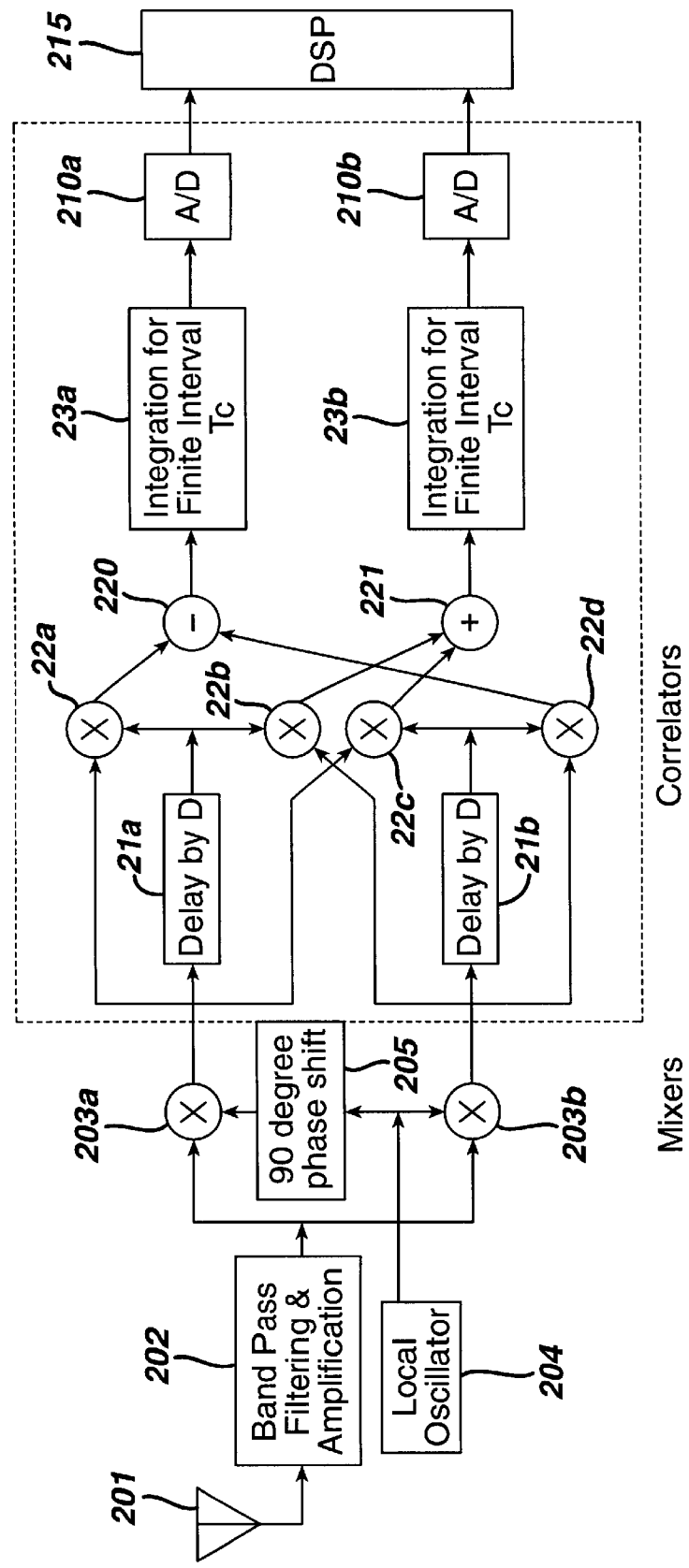

FIG. 10D shows an improvement to the invention using baseband demodulation to modify the shape of the correlation function of the received signal. Antenna 201 receives the ultra-wideband signal which is then bandpass filtered and amplified by amplifier 202. This signal is mixed in quadrature in mixers 203a and 203b resulting in real and imaginary parts of the complex incoming signal. The frequency of the local oscillator is chosen to approximate the frequency of the maximum spectral power density of the received signal from amplifier 202. The baseband signals from mixers 203a and 203b are delayed by time D in delays 21a and 21b, respectively. The outputs of delays 21a and 21b are then correlated with the undelayed signals from mixers 203a and 203b using analog multiplying correlators 22a, 22b, 22c, and 22d. The analog outputs from these correlators are subtracted and added in subtracter 220 and adder 221, respectively. The resulting analog signals from subtracter 220 and adder 221 can be seen to be an analog implementation of a complex correlation between the delayed and undelayed versions of the complex baseband signal from mixers 203a and 203b. The difference output of subtracter 220 is the real part, and the summed output of the adder 221 is the imaginary part of the complex correlated signal. Integrators 23a and 23b perform a complex integration which is digitized by ADCs 210a and 210b. The digitized results are sent to DSP 215. When implementing a receiver with multiple delay channels, then the items in the dotted line (21a–b, 22a–d, 23a–b, 210a–b, 220, 221) are repeated once for each different delay channel. Each receiver requires only one copy of antenna 201, amplifier 202, mixers 203a and 203b, local oscillator 204, phase shifter 205 and DSP 215.

Figure 11A:
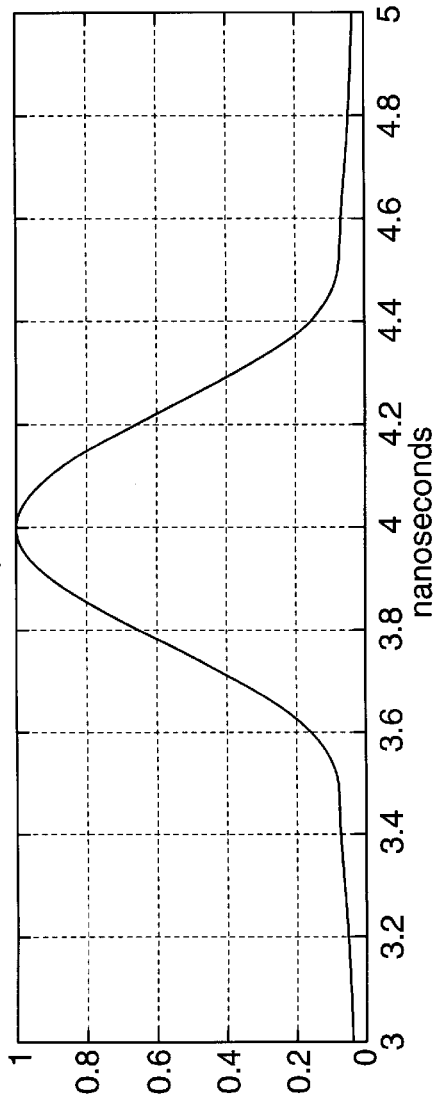
Figure 11B:
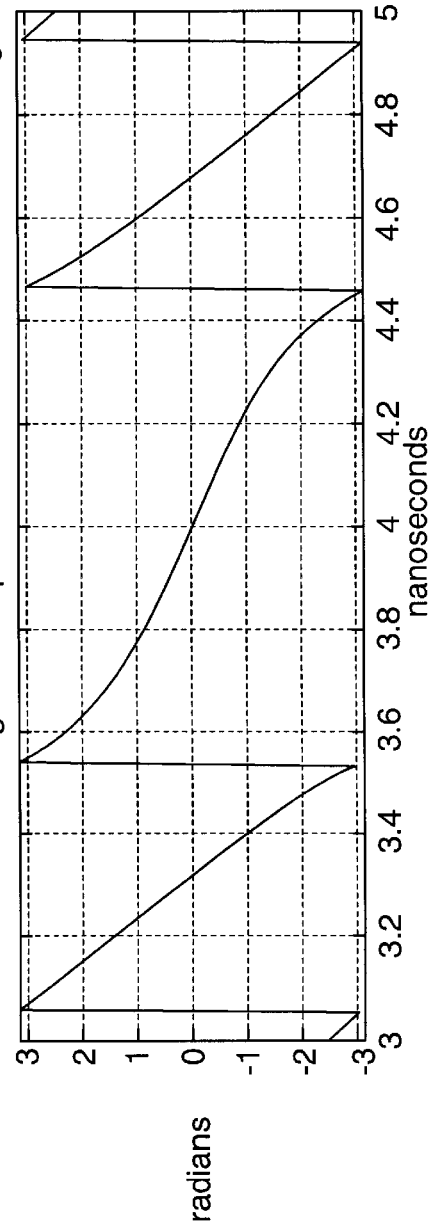
Figure 11C:
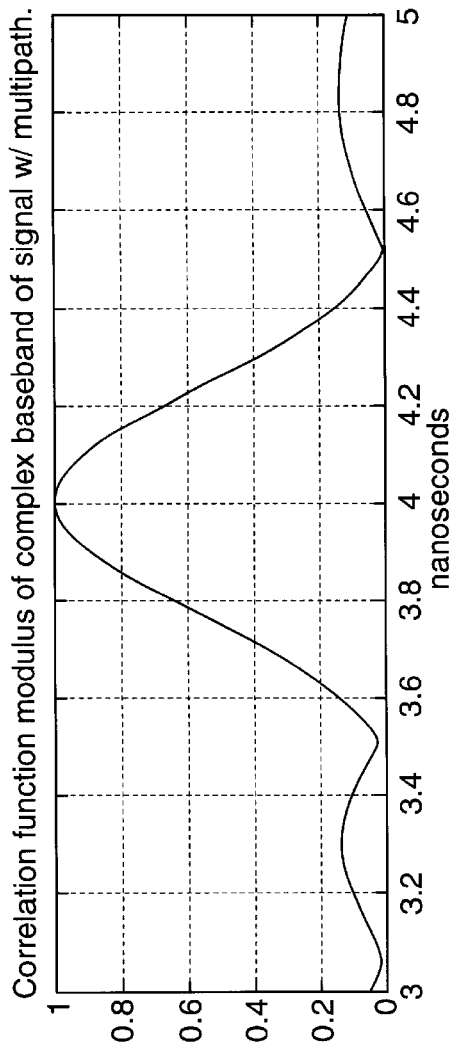
FIGS. 11C and 11D are timing diagrams showing, respectively, the correlation function modulus and phase angle of complex baseband of signal with multipath.
Figure 11D:
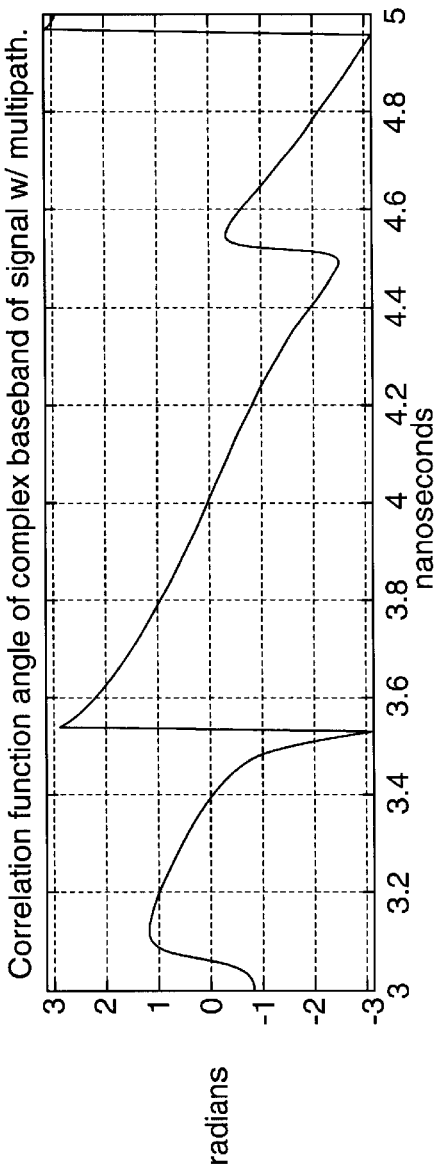

FIGS. 11A, 11B, 11C, and 11D depict the correlation function of the complex baseband signal whose correlation is found by the pulse pair correlators of FIG. 10D, normalized to their peak values. FIGS. 11A and 11C correspond to the plots of FIGS. 9A and 9B, respectively, except that the modulus of the autocorrelation function of the complex baseband signal is plotted, whereas FIGS. 11B and 11D show the phase of the autocorrelation function of the complex baseband signal. The moduli in FIGS. 11A and 11C are values calculated by DSP 215 as the root sum of squares of the values from ADCs 210a and 210b. The phases in FIGS. 11B and 11D are values as calculated by DSP 215 as the arctangent of values from ADCs 210a and 210b. FIGS. 11A and 11B show the correlation function of a transmission without multipath, while FIGS. 11C and 11D show one with multipath. Each of these pairs of figures, FIGS. 11A and 11B and FIGS. 11C and 11D, shows the correlation functions of transmissions composed of pulse pairs with both pulses in the same polarity. For transmissions composed of pulse pairs whose pulses differ in polarity, the phase plots will be offset by $\pi$ radians.

An important feature of FIGS. 11A and 11C is the width of the central lobe of the correlation function, which is approximately one nanosecond. This correlation plot suggests that if the transmit/receive delay mismatch is in the range of plus or minus 200 picoseconds (ps), then the expected loss in detection energy is less than 1 dB. This allows for about an order of magnitude reduction in the required accuracy of the delay elements in the transmitter and receiver, using the receiver depicted in FIG. 10D. This decrease in required accuracy also allows a wider range of variation of the delay values with temperature.

The receiver of FIG. 10D allows the user of pulse polarity in the signaling scheme used with it. Referring to FIGS. 11A and 11B, it can be seen that, as the receive delay differs more from the nominal delay of 4 nanoseconds (ns), not only does the correlation function amplitude decrease, but its phase angle becomes non-zero. This is true both with and without multipath, as can be seen by comparing FIGS. 11A and 11B with FIGS. 11C and 11D. When pulse pairs having opposite polarity in the transmitted pulses are received, the modulus of the computed correlation value is the same as that which is computed for pulse pairs having the same polarity; however, the phase differs by $\pi$ radians. In order to make full use in bit detection of the energy represented by the correlation function modulus, the observation must be detected in a coherent manner. This kind of bit detection is enabled by the receiver structure of FIG. 10D.

The receiver of FIG. 10D calculates the phase angle and amplitude of the complex value formed by the values from ADCs 210a and 210b. The operation of estimating the phase angle of a sequence of complex values modulated by an information sequence is one that is well-known in the art of communication receiver design. See H. Meyr, M. Moeneclaey and S. A. Fechtel, *Digital Communication Receivers*, John Wiley & Sons (1998). This operation can be performed either through the use of local bit decisions or by squaring the input data. The correction of the phase allows the complex output of ADCs 210a and 210b to be converted to a real number the sign of which depends on the phase angle calculated from ADCs 210a and 210b. The real data so produced is either positive or negative, depending upon the relative phases of the pulses in the received pulse pairs, and so can be used in a manner which is completely analogous to the output of the receiver depicted in FIG. 2. The absolute value of this data is determined by the modulus of the correlation function at this mismatched delay, and so it is relatively insensitive to delay mismatch.

Note that if multiple delay channels are required are required in the receiver of FIG. 10D, the same I/Q converter can be shared by all the delay channels. Note also that if additional protection against delay variations is required, multiple delays per receiver channel can be implemented. For example, each delay channel could be replicated three times, once with the nominal delay, once with the nominal delay minus an offset and once with the nominal delay plus the same offset. For each transmitter being tracked, the best delays for each channel could be found by comparison of output energies.

Since the receivers of FIGS. 10C and 10D operate by computing the autocorrelation of the input signal at a certain lag, they will also compute the autocorrelation at the same lag of any noise that is added to the signal. If the noise autocorrelation at that lag is non-zero, then it will produce an additive offset to the signal autocorrelation that will increase the bit error probability. This effect can be corrected in one of two ways, both of which require knowledge of the noise autocorrelation function. The first option is to specify the nominal delays at known zeros of the noise autocorrelation. The second is to subtract the known, non-zero noise correlation value from the output of the receiver prior to detection of bits. The noise autocorrelation function can be obtained from the frequency response functions of the front end filters that band limit the noise.

Delay Hopping

Delay hopping is a code division multiple access (CDMA) scheme to be used with transmitted reference UWB. A limited amount of multiple access capacity is available in TR UWB by transmitting and receiving pulse pairs with separate delays. A receiver tuned to one delay will respond to received pulse pairs at a separate delay at a far lower energy level than it would to pulse pairs transmitted with its own delay value. However, when multiple transmissions with different delays are present at the receiver's antenna, spurious correlations between pulses originating from different transmitters can occur. By using lone CDMA code words whose chips represent a multiplicity of delays, delay hopping allows for a greater multiple access capacity than simply transmitting with different delays. All $N_p$ doublets in each chip are either pairs of pulses of the same polarity (polarity +1) or pairs of pulses of opposite polarity (polarity −1).

Figures 12, 13:
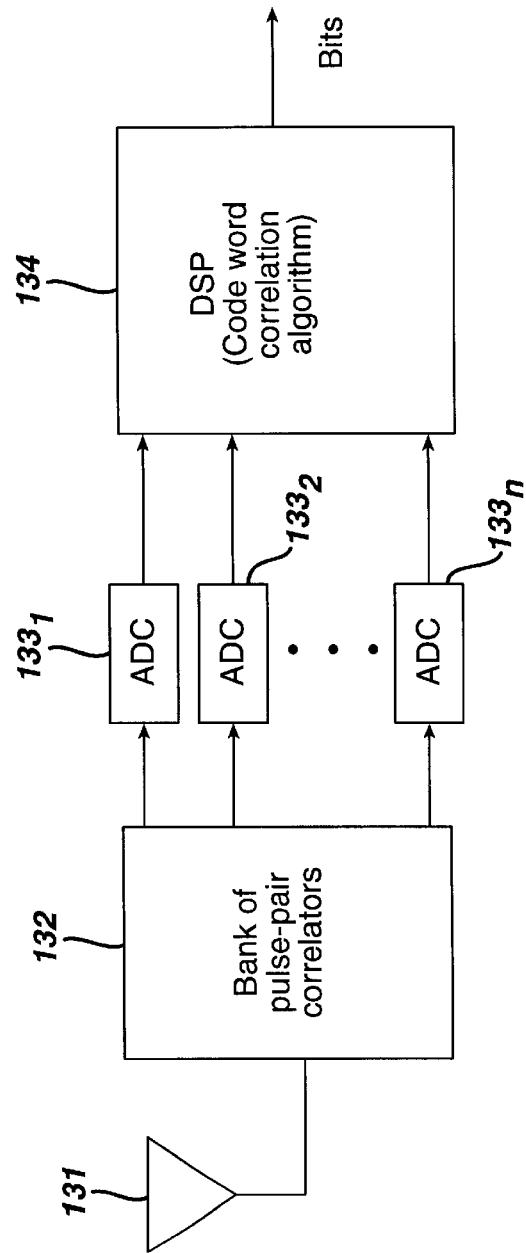
FIG. 12 is a diagram illustrating the structure of a TR/DH code word.
FIG. 13 is a block diagram of the top-level structure of the UWB TR delay-hopped CDMA receiver.

A TR/DH code word consists of N chips, transmitted sequentially. Each chip is composed of $N_p$ doublets (or other n-tuples), all receivable with the same correlation circuit. Doublets transmitted in different chip intervals are, in general, characterized by different delays. The PRT within a given chip interval varies randomly about some nominal or average pulse repetition time. The structure of the TR/DH code word is depicted in FIG. 12. Each chip comprises $N_p$ pulse pairs separated by interpulse delay $D_i$, with code word polarity bit $B_i$, i=1, 2, . . . , $N_c$, where $N_c$ is the number of chips in the code word. Note that the chip values are distinct both in associated delay value and in the polarity of the transmitted bit (±1). When a code word of Nc chips is used to send one data bit, then if the data bit to be sent is a one, all doublets in each chip of the code word has the polarity of the code word polarity bit. If the data bit to be sent is zero, then all doublets in each chip of the code word is transmitted with the opposite polarity of the code word polarity bit.

Typical values of the parameters are as follows. The number of chips in a code word ($N_c$) will be in the range of 50 to 1000, and the duration of each chip will be in the range of 1 to 10 $\mu$s. The number of pulses in a chip interval ($N_p$) will be from 10 to 50. The average time between pulse pairs will be about 100 nanoseconds (ns). The time delays separating the two pulses of a doublet are drawn from a small set of possible time intervals, typically from 4 to 16 of them, all less than the average PRT in duration. While there is no fundamental limitation on the duration of the intervals separating individual pulses in the doublet, shorter delays will be more accurately implementable in the transmitter and the receiver. For example, if 500 chips, each consisting of 20 doublets with an average pulse repetition time of 100 ns are transmitted, the entire TR/DH code word will take 1 millisecond to transmit. If each code word transmits one bit of information, then the bit rate is 1 Kbit/sec.

The DH code words are the most important part of the delay-hopped code division multiple access (CDMA) scheme. They can easily be found using a computer search. For example, we have generated a set of 1000 of them, each composed of 200 chips, with delays drawn from a set of 16 possible delays. All of these code words have autocorrelation side lobes that are less than 7% of the peak autocorrelation in absolute value. The maximum of the absolute value of the cross-correlation at any lag between any pair of these words is less than 10% of the peak autocorrelation. Longer codes, composed of more chips, will have even better correlation properties.

The top-level structure of the receiver is depicted in FIG. 13. The receiver for a TR/DH code word consists of a bank of pulse-pair correlators 132 connected to antenna 131. Each correlation in the bank of pulse-pair correlators is tuned to a different delay. The bank of pulse-pair correlators is followed by a code word correlation. The code word correlation is implemented as software running on a digital signal processor (DSP) 134. The outputs of all of the correlators are sampled by analog-to-digital converters (ADCs) $133_1$, to $133_N$, and the digital data is transferred into the DSP 134. A typical sample rate for these ADCs is in the range of 2 msps to 12 msps. This rate is determined by the chip time. In general, it is desirable to have two or more samples per chip.

The chip signals at the outputs of the bank of pulse-pair correlators are characteristically peaked as shown, for example, in FIG. 4B. These signals are of duration approximately equal to twice the integration time of the pulse-pair correlators. This set of waveforms will be sampled at a rate yielding, typically, 2 to 5 samples per chip period, and then sent to the delay-hopped code word detector implemented in the DSP 134. The DH code detector algorithm will take samples of the multiple outputs of the bank of pulse-pair correlators and add them together in a manner dictated by the expected DH code word. The objective of this operation is to produce the registered sum of all the chip signals; when the expected code word matches the transmitted code word, this operation will have the effect of applying a gating waveform, matched to the entire DH code word waveform, to the observed data. If the gating waveform matches the shape of the chip signal waveform, a matched filter is implemented; however, this requires knowledge of the relative timing of the sample clock and the transmitter chip clock. This knowledge can be derived from the received data, as described below.

Specifically, if $N_s$, is the number of samples per chip (an integer), then the total number of sample times over which code word detection must be performed is $N_s$, times $N_c$. If $N_d$ is the number of different intrapulse-pair delays used by the code (and therefore the number of pulse pair correlators in the receiver), then the total number of samples to be retained for correlation is $N_s$, times $N_c$, times $N_d$. Of these samples, only those delays matching the delay specified by the structure of the code word should be added. Since we have specified that the number of samples in each chip interval be an integer, the number of samples in each pulse-pair correlation output waveform is an integer. Furthermore, the samples in each of the pulse-pair correlation output waveforms have the same time relationship to the start times of the chips for all waveforms, so that they can be added up coherently, given a knowledge of the code transmitted code word.

Figure 14:
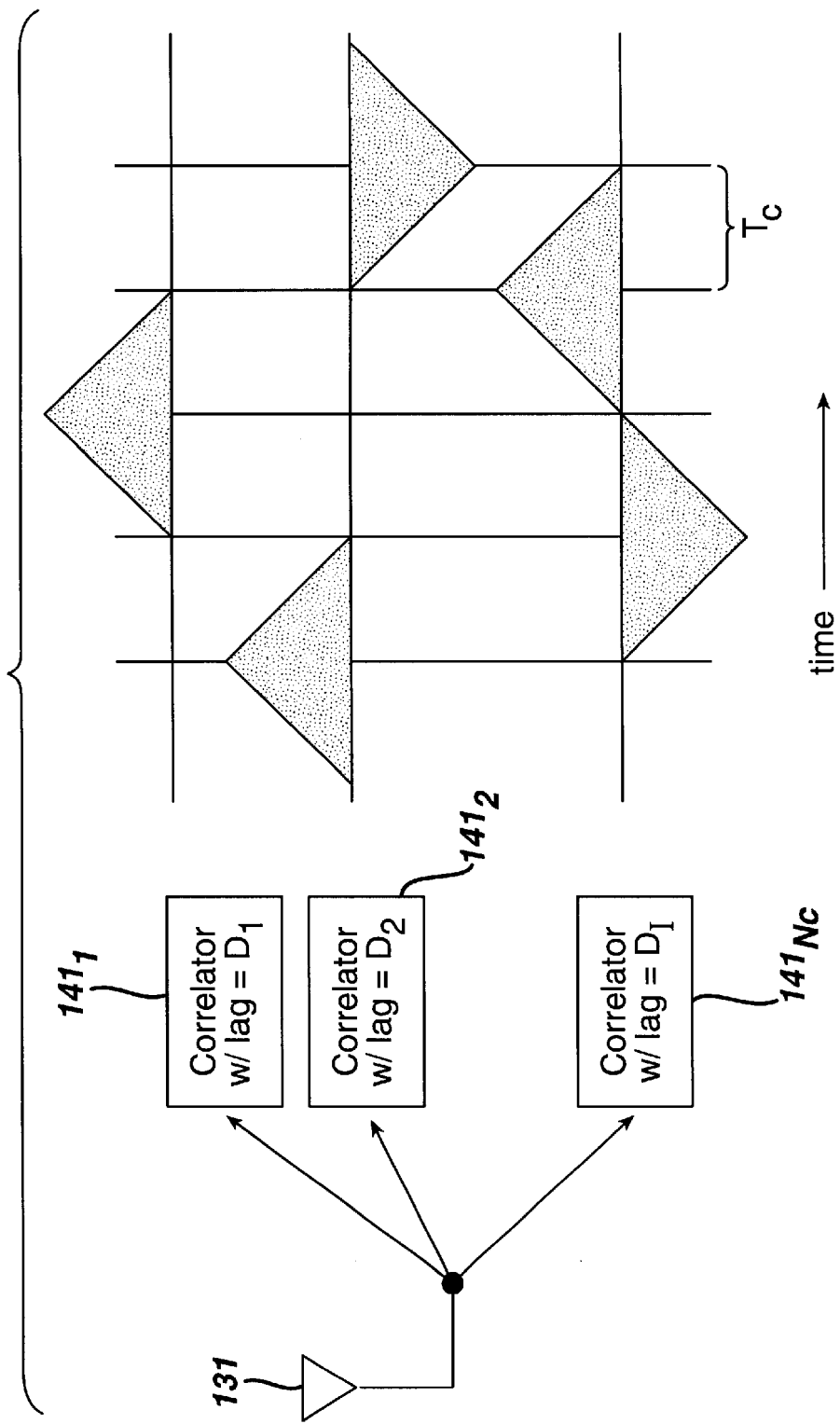
FIG. 14 is a block diagram of the first stage of the UWB TR delay-hopped CDMA receiver.

A schematic representation of the bank of correlators and its output waveforms, which we have called chip waveforms, is given in FIG. 14. The antenna 131 provides inputs to correlators $141_1$ to $141\_\{func\{N\_c\}\}$, which comprise the bank of pulse-pair correlators 132.

To make the code correlation idea more concrete, let us consider an example. Suppose we consider the receiver chip waveforms of FIG. 14. Let us specify the number of delays as I=3 and the code word length as $N_c$=5, and let us consider the depicted set of pulse pair correlation output waveforms as representing a complete code word. This code word could be denoted by a sequence of delay indices and code word polarity bits: (2,1; 3,-1;1, 1;3, 1 2, -1). This specification says that the first chip of the code word is expected on delay number 2 and will convey a transmitted bit value of +1, the second chip has delay value number 3 and bit value of -1, and so on. Let us further suppose that we have $N_s$=2 samples during each chip interval on each delay channel (each pulse pair correlation output). These samples are separated by $T_s/2$, where $T_s$ is the chip interval duration. Thus, there are four samples for each waveform, and each waveform is sampled at the same times, relative to its own starting time. The samples are collected three at a time, with all samples collected simultaneously. The four samples from each waveform could be transferred into the DSP 134 and multiplied by the expected chip values and the products added together, producing a sampled correlation output waveform at a much higher SNR. The set of expected chip values includes zero, which is applied to combinations of delay channels and chip times not included in the code word.

Figure 15:
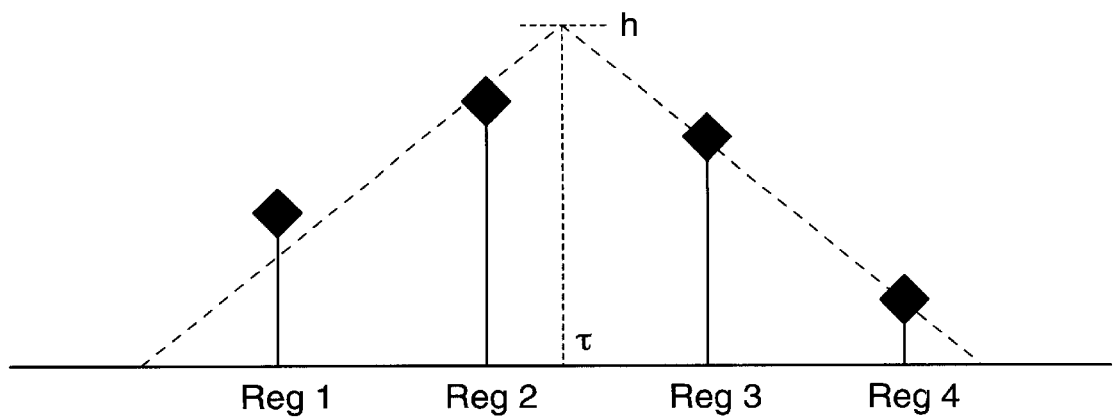
FIG. 15 is a diagram illustrating the computational set-up for the code word correlation of the delay-hopped CDMA receiver.

To continue with our example, suppose we compute this result at the time instant depicted in FIG. 14, assuming that the DSP 134 is correlating with the DH code word that has just been fully received. The oldest (leftmost) set of three input data samples available to the DSP would have a positive value on channel 2, and zeros on channels 1 and 3. The algorithm would multiply the value on channel 2 by 1, because the first chip is positive, and add the product to the first of four registers that had been initialized to zero. The second set of three samples consists of a larger value for channel 2, but also has zeros in channels 1 and 3. The algorithm adds the new value to register 2. The third set of samples contains non-zero data on both channels two and three. The data on channel three is negative-valued, but the second chip of the desired code word is also negative, so multiplication by the gating waveform negates the negative value, and a positive number is added to register 1. The positive value on channel 2 is multiplied by 1 and added to register 3. This process continues in the manner just described until all the samples in the code word are accumulated. In general, at each sample time, two non-zero samples will be added into two separate registers. The result of this process is depicted in FIG. 15, for the case where the expected code word has just been received and the transmitted bit value is +1. The values plotted are the final values of the four registers.

Once the output samples of the code word correlation (represented by black diamonds in FIG. 15) have been formed in the DSP 134, the receiver must decide if a code word has been received during the last sample interval. This decision is to be made by comparing the energy in the compounded, received samples to a threshold. If this decision is positive, other data must be derived from the samples. In the data transmission application of TR/DH, the code word would be modulated by a ±1, which would represent the transmitted information. One way to estimate this value is to fit a model of the pulse-pair correlation output waveform to the samples at the output of the code word generator. Such a fit could be done on the basis of minimum-squared error, which would result in the optimum fit for Gaussian observation noise. It can be demonstrated that the observation noise is Gaussian. The possible result of this algorithm is shown in FIG. 15, superimposed over the sample values. The fitted model is controlled by two parameters, the amplitude, or height, h, and the location of the peak,τ. This information can be supplemented by the sum of squared errors for the best fit whose peak value is within the current sample interval. The absolute value of the peak value and the sum of squared errors can be combined and compared to a threshold to detect the code word. The value of τ can be used as an estimate of the timing phase of the code word. The sign of the estimated value of h can be used to detect the transmitted bit value.

When the receiver is looking for a TR/DH code word without any prior synchronization information, the algorithm just described is executed for each new set of samples, that is, at the end of each sample interval. When the receiver is receiving a sequence of TR/DH symbols, only samples close to the expected time of the next bit need be processed. An alternative method of bit detection for the data transmission application would be a matched filter applied to the output of the code word correlation. This would require an estimate of the value of τ, which could be obtained and refined by standard methods, such as the well-known early/late gate scheme as described by J. G. Proakis in *Digital Communications*, 3d Ed., McGraw-Hill, 1995, for example. Application of this scheme to the present invention would require the interpolation of two waveform values from the data in the registers labeled in FIG. 15. These values would be early and late gates spaced symmetrically around the peak at τ.

It is worth noting that the output of the pulse-pair correlation is only approximately triangular, even given an ideal finite impulse response integrator. This is because the individual pulse-pair correlation output waveforms are not smoothly triangular, but rather ascend and descend in discrete steps, rather than smoothly, as shown in FIG. 4B. The location of these steps in time changes randomly, under the influence of the PRT, which is randomly dithered at the transmitter. It can be shown that the sum of such waveforms converges to a triangle.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An ultra-wideband (UWB) radio communication system comprising:

a transmitter far generating pairs of pulses separated by a time interval, D, wherein transmitted data is encoded by a relative polarity of two pulses of a pair of pulses; and a receiver having a pulse-pair correlator (132), the pulse-pair correlator including a delay (21) for delaying a received signal by the time interval, D, a signal multiplier (22) for multiplying delayed and undelayed versions of the received signal, and a finite impulse response integrator (23) for integrating a product signal output by the signal multiplier (22), wherein said delay is varied in a fixed pattern known to both of the transmitter and the receiver.

2. The UWS radio communication system of claim 1, wherein the time interval D is selected to correspond to a specific value of an autocorrelation function of an additive noise that obscures the signal, to thereby reduce the effect of the additive noise.

3. The UWB radio communication system of claim 1, wherein a known value of an autocorrelation function at a lag, given by the time interval D, is subtracted from an output of the finite impulse response integrator prior to bit decisions being made.

4. The UWB radio communication system of claim 1, wherein the pairs of pulses generated by the transmitter have waveforms designed so that their power spectral densities are such that, after any frequency translation to the center of an operating band, they are essentially spectrally disjoint with frequencies that must be protected.

5. The UWB radio communication system of claim 1, wherein the transmitter is adapted to transmit pairs of pulses at a pulse repetition rate (PRT) which is varied in order to shape a spectrum of transmission.

6. The UWB radio communication system of claim 1, wherein more than one pair of pulses is associated with each information bit, the pairs of pulses which are associated with a common information bit having a fixed time interval between pulses and the integration time of the finite impulse response integrator (23) being determined by a time required to transmit a number of pairs of pulses associated with an information bit.

7. The UWS radio communication system of claim 1, wherein the transmitter is adapted to generate three or more pulses separated by a known sot of delays with controlled polarities for representing one or more information bits.

8. The UWS radio communication system of claim 7, wherein the receiver is adapted to perform N-1 correlations to recover encoded information, where N is the number of pulses generated by the transmitter to represent one or more information bits.

9. The UWB radio communication system of claim 1, wherein the transmitter is adapted to transmit a code word consisting of Nc chips, transmitted sequentially, each chip being composed of Np pairs of pulses separated by a same time interval.

10. The UWS radio communication system of claim 9, wherein the receiver comprises a bank of pulse-pair correlators (132), each correlator in the bank being tuned to a different delay (21), and further comprising a code word correlator for receiving outputs of the bank of pulse-pair correlators (132) and generating information bits as an output.

11. The UWS radio communication system of claim 10, wherein the code word correlation is adapted to be implemented as software running on a digital signal processor (134), further comprising a plurality of analog-to-digital converters (133) each connected to sample a corresponding output of the bank of pulse-pair correlators (132) and provide digital inputs to the digital signal processor (134).

12. The UWS radio communication system of claim 1, wherein the receiver further Comprises a baseband demodulator (101) for converting a the received signal to real and imaginary parts of a complex output, the delay (21) being adapted to delay both the real and imaginary parts of the complex output and the signal multiplier (22) being adapted to perform a complex multiplication of a direct path by a complex conjugate of a delayed path, the finite impulse response integrator (23) comprising two integrators, one for the real part and another for the imaginary part of the product signal output by the signal multiplier (22).

13. The UWO radio communication system of claim 12, further comprising means for taking a modulus of a complex quantity connected to the output of the finite impulse response integrator (23).

14. The UWB radio communication system of claim 12, further comprising:
    phase estimating means for estimating a phase of an output of the finite impulse response integrator (23); and
    a phase correction multiplier for performing a multiplication of the output of the finite impulse response integrator (23) and a complex conjugate of a phasor having the estimated phase to correct the phase of the output of the integrator (23), thereby allowing both positive and negative transmitted pulses to be received and detected.

15. The UWB radio communication system of claim 1, wherein the delay time interval D comprises a plurality of delays where the plurality of delays have nominal values spread around a nominal value of the transmitter's delay, a delay actually used for demodulation being selected from among existing delays as that one whose output has the highest energy in response to a transmission at the nominal delay.

16. The UWB radio communication system of claim 15, wherein the selected delay is adapted to be varied to account for drift in a delay value at the transmitter or receiver caused by temperature variations.

17. The UWB radio communication system of claim 15, wherein the selected delay comprises different delays for different transmitters.

18. A method of ultra-wideband (UWB) radio communication comprising the steps of:
    generating pairs of pulses separated by a time interval, D in a transmitter;
    encoding data by a relative polarity of two pulses of a pair of pulses;
    transmitting the data encoded as pairs of pulses;
    receiving the data encoded in a receiver;
    delaying received encoded data by the time interval, D; and
    correlating the received encoded data by the steps of complex conjugate multiplying delayed and undelayed versions of the received encoded data and integrating a signal produced by the complex conjugate multiplication;
    wherein said delaying is varied in a fixed pattern known to both of the transmitter and the receiver.

19. The method of UWB radio communication of claim 18, further comprising the step of selecting the time interval D to correspond to a specific value of an autocorrelation function of the an additive noise that obscures the signal, thereby reducing the effect of the additive noise.

20. The method of UWB radio communication of claim 18, further comprising the step of subtracting a known value of an autocorrelation function at a lag, given by the time interval D, from an output of the step of integrating prior to bit decisions being made.

21. The method of UWB radio communication of claim 18, wherein the step of generating pairs of pulses is performed by generating pulses which have waveforms designed so that their power spectral densities are such that, after any frequency translation to the center of an operating band, the generated pulses are essentially spectrally disjoint with frequencies that must be protected.

22. The method of UWS radio communication of claim 18, wherein the step of transmitting pairs of pulses is performed by transmitting the pairs of pulses at a pulse repetition rate (PRT) which is varied in order to shape a spectrum of transmission.

23. The method of UWB radio communication of claim 18, wherein in the step of encoding, more than one pair of pulses is associated with each information bit, the pairs of pulses which are associated with a common information bit having a fixed time interval between pulses and the integration time in the step of correlating being determined by a time required to transmit a number of pairs of pulses associated with an information bit.

24. The method of UWB radio communication of claim 18, wherein the step of generating is performed by generating three or more pulses separated by a known set of delays with controlled polarities for representing one or mare information bits.

25. The method of UWB radio communication of claim 24, wherein the step of correlating performs N−1 correlations to recover encoded information, where N is the number of pulses generated by the transmitter to represent one or more information bits.

26. The method of UWB radio communication of claim 18, wherein the step of transmitting is performed by transmitting a code word consisting of Nc chips, transmitted sequentially, each chip being composed of Np pairs of pulses separated by a same time interval.

27. The method of UWB radio communication of claim 26, wherein the step of correlating is performed for each pulse-pair, each correlation being tuned to a different delay, and further comprising the steps of:

receiving correlation signals generated by correlating each pulse-pair;

correlating a code word from the received correlation signals; and generating information bits as an output.

28. The method of UWB radio communication of claim 27, wherein the step of correlating a code word is performed on a digital signal processor, further comprising the step of performing analog-to-digital conversions of the received correlation signals and providing digital inputs to the digital signal processor.

29. The method of UWB radio communication of claim 18, wherein the step of receiving further comprises the step of baseband demodulating a received signal to convert the received signal to real and Imaginary parts of a complex output, the delay delaying both the real and imaginary parts of the complex output, the step of multiplying performing a complex multiplication of a direct path by a complex conjugate of a delayed path, and the step of integrating performing an integration for the real part and another for the imaginary part of the product signal output produced by the step of multiplying.

30. The method of UWB radio communication of claim 29, further comprising the step of taking a modulus of a complex quantity output by the step of integrating.

31. The method of UWB radio communication of claim 29, further comprising the steps of:

estimating a phase of an output of the step of integrating; and performing a multiplication of the output of the step of integrating and a complex conjugate of a phasor having the estimated phase to correct the phase of the output of the step of integrating, allowing both positive and negative transmitted pulses to be received and detected.

32. The method of UWB radio communication of claim 18, wherein the delay time interval D comprises a plurality of delays where the plurality of delays have nominal values spread around a nominal value of the transmitters delay, a delay actually used for demodulation being selected from among existing delays as that one whose output has the highest energy in response to a transmission at the nominal delay.

33. The method of UWB radio communication of claim 32, wherein the selected delay is varied to account for drift in a delay value at the transmitter or receiver caused by temperature variations.

34. The method of UWS radio communication of claim 32, wherein the selected delay comprises different delays for different transmitters.

* * * * *